US009190109B2

(12) United States Patent
Matias et al.

(10) Patent No.: US 9,190,109 B2
(45) Date of Patent: Nov. 17, 2015

(54) SYSTEM AND METHOD FOR VIDEO POETRY USING TEXT BASED RELATED MEDIA

(75) Inventors: Joven Matias, Pasadena, CA (US); Nicklas Wilson, Englewood, CO (US); David Watson, Valencia, CA (US); Susie Kim, Playa del Rey, CA (US); Michael Gustafson, North Hollywood, CA (US); David Bier, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 178 days.

(21) Appl. No.: 12/661,803

(22) Filed: Mar. 23, 2010

(65) Prior Publication Data

US 2011/0239099 A1 Sep. 29, 2011

(51) Int. Cl.
*G06F 17/00* (2006.01)
*G11B 27/034* (2006.01)
*G06F 17/30* (2006.01)
*G11B 27/34* (2006.01)

(52) U.S. Cl.
CPC ........ *G11B 27/034* (2013.01); *G06F 17/30017* (2013.01); *G06F 17/30056* (2013.01); *G11B 27/34* (2013.01)

(58) Field of Classification Search
CPC .... G11B 27/034; G11B 27/34; G06F 17/211; G06F 17/30017; G06F 17/30056
USPC .............................. 715/200–204, 211; 704/1
See application file for complete search history.

(56) References Cited

U.S. PATENT DOCUMENTS

| 5,524,193 | A  | * | 6/1996  | Covington et al. ........... 715/210 |
|-----------|----|---|---------|--------------------------------------|
| 6,490,580 | B1 | * | 12/2002 | Dey et al. ...................... 715/203 |
| 2003/0101230 | A1 | * | 5/2003  | Benschoter et al. .......... 709/217 |
| 2005/0114283 | A1 | * | 5/2005  | Pearson et al. ..................... 704/1 |
| 2005/0198006 | A1 | * | 9/2005  | Boicey et al. ..................... 707/2 |
| 2006/0152622 | A1 | * | 7/2006  | Tan et al. ....................... 348/473 |
| 2006/0217979 | A1 | * | 9/2006  | Pahud et al. .................. 704/257 |
| 2007/0033531 | A1 | * | 2/2007  | Marsh ........................... 715/738 |
| 2007/0094333 | A1 | * | 4/2007  | Schilling et al. .............. 709/206 |
| 2007/0255702 | A1 | * | 11/2007 | Orme ................................. 707/5 |
| 2008/0155627 | A1 | * | 6/2008  | O'Connor et al. ............ 725/109 |

(Continued)

OTHER PUBLICATIONS

IEEE; IEEE 100 The Authoritative Dictionary for IEEE Standards Terms; 2000; IEEE Press; Seventh Edition; p. 872.*

(Continued)

*Primary Examiner* — Chau Nguyen
(74) *Attorney, Agent, or Firm* — Farjami & Farjami LLP

(57) ABSTRACT

There is provided a system and method for creating video poetry using text based related media. There is provided a method for creating a video poetry media, the method comprising receiving an ordered list of text phrases selected from a defined plurality of text phrases, presenting a plurality of video clips, wherein each of the plurality of video clips is associated with one or more of the ordered list of text phrases, receiving an ordered list of video clips selected from the plurality of video clips, and generating the video poetry media using the ordered list of video clips. In this manner, the barrier of entry for creating video poetry media is reduced, encouraging increased user participation and the creation of the "viral" effect by sharing video poetry online. Positive publicity for associated brands and media properties and additional channels for commercial promotions are thereby provided.

20 Claims, 4 Drawing Sheets

(56) References Cited

U.S. PATENT DOCUMENTS

| | | | | |
|---|---|---|---|---|
| 2008/0295130 | A1* | 11/2008 | Worthen | 725/34 |
| 2008/0301128 | A1* | 12/2008 | Gandert et al. | 707/5 |
| 2008/0304807 | A1* | 12/2008 | Johnson et al. | 386/52 |
| 2009/0177633 | A1* | 7/2009 | Basu et al. | 707/3 |
| 2009/0307207 | A1* | 12/2009 | Murray | 707/5 |
| 2010/0005378 | A1* | 1/2010 | Braun et al. | 715/202 |
| 2010/0066903 | A1* | 3/2010 | Yang | 348/468 |
| 2010/0209003 | A1* | 8/2010 | Toebes et al. | 382/209 |

OTHER PUBLICATIONS

No Author; Our Twist Words; No Date; Channel 4; pp. 1-3. Retrieved from http://twist.channel4.com/words.*

Laughlin, Andrew; Channel 4 launches online 'Twist' campaign; Nov. 15, 2010; digital spy; pp. 1-2. Retrieved from http://www.digitalspy.com/tech/news/a287903/channel-4-launches-online-twist-campaign.html.*

Peter Decherney and Louise Krasniewicz, "Steps in Making a Video Mashup", Jun. 2008, http://www.library.upenn.edu/wic-multimedia/tutorials/mashup.html, pp. 1-2.*

* cited by examiner

SYSTEM AND METHOD FOR VIDEO POETRY USING TEXT BASED RELATED MEDIA

BACKGROUND OF THE INVENTION

1. Field of the Invention

The present invention relates generally to video media. More particularly, the present invention relates to the creation of video media.

2. Background Art

A popular means of creative expression is the "video mash-up", similar to a music video or promotional clip. By creatively mixing and transitioning different video clips together and adding effects or other unique touches, there is potential to create a video that is more than the sum of its parts. By sharing such videos with friends and colleagues online, the videos may enjoy viral popularity and bring increased customer awareness to featured brands and media properties. Users can have fun creating and watching video mash-ups shared online while content providers and brands can enjoy positive publicity.

Unfortunately, present methods of creating video mash-ups are very technical, requiring detailed understanding of media production techniques and software. The process of searching, selecting, extracting, synchronizing and mixing of suitable video clips is laborious, time intensive, and tedious. Furthermore, high quality source video material is often difficult to obtain, forcing users to use low quality clips found on the Internet. As a result, most users are discouraged from creating video mash-ups, as only a very small portion of the general population is willing and able to devote the required time, resources, and specialized knowledge for the creation of video mash-ups.

Accordingly, there is a need to overcome the drawbacks and deficiencies in the art by providing an easy and enjoyable way for users to create video mash-ups.

SUMMARY OF THE INVENTION

There are provided systems and methods for creating video poetry using text based related media, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for video poetry using text based related media. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
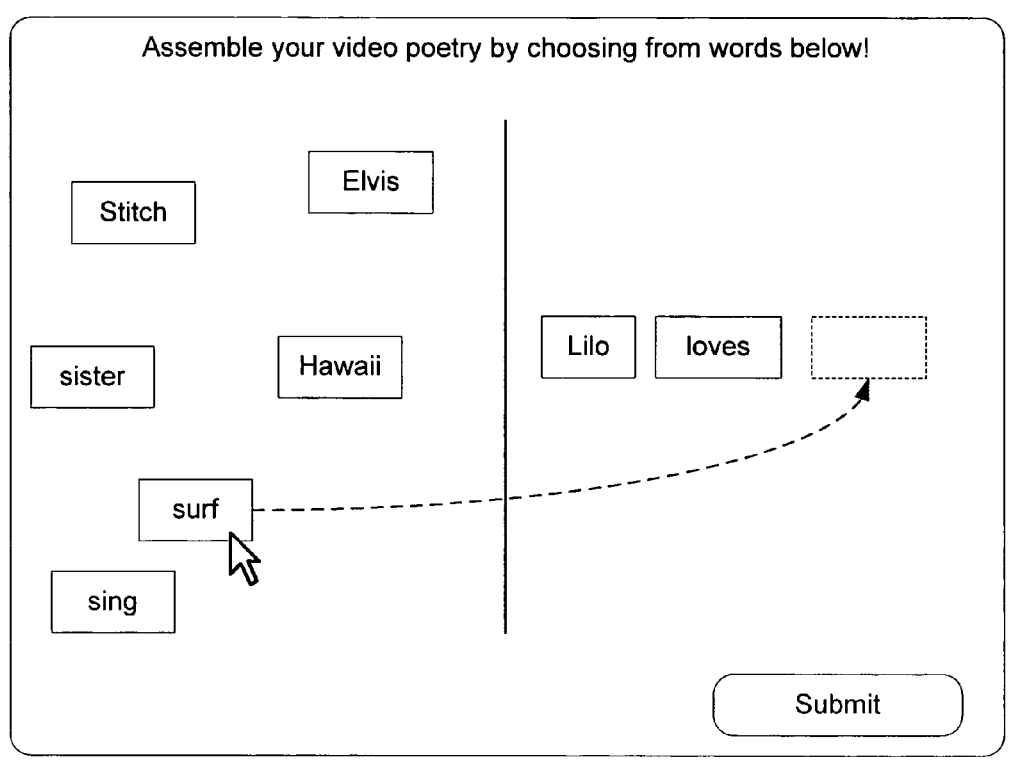
FIG. 1 presents a user interface for selecting text phrases for video poetry using text based related media, according to one embodiment of the present invention.

FIG. 1 presents a user interface for selecting text phrases for video poetry using text based related media, according to one embodiment of the present invention. As shown in display 100 of FIG. 1, a user interface is presented allowing the selection and arrangement of various pre-defined words or text phrases to form a sentence. A processor of a web server may present the user interface using, for example, scripting techniques such as AJAX (asynchronous JAVASCRIPT® and XML) and/or plug-in technology such as FLASH®. The particular pre-defined text phrases available may, for example, be selected by a user from a chosen category, extracted from associated tags of a linked media, matched thematically to a specific website or subject matter, or derived from company branding or creative properties. Additionally, opportunities for personalization may be provided here, such as allowing users to submit suggestions for text phrases. For the embodiment shown in diagram 100 of FIG. 1, the pre-defined text phrases are related to the creative property LILO AND STITCH® by DISNEY®.

The embodiment shown in FIG. 1 allows a user to drag and drop text phrases, but alternative embodiments may provide alternative selection methods. For example, the user may be invited to begin typing words, and an auto completion feature may allow the user to select text phrases from the pre-defined text phrases most similar to the text being typed. In another alternative embodiment, the user may be prompted to recite a sentence through a microphone, and speech recognition analysis may be performed on the received audio to generate a valid text sentence. Furthermore, although English words are shown in FIG. 1, alternative embodiments may use other languages as well. Once the user is satisfied with the sentence, the user may click the "Submit" button to proceed to the next step, shown in FIG. 2.

Figure 2:
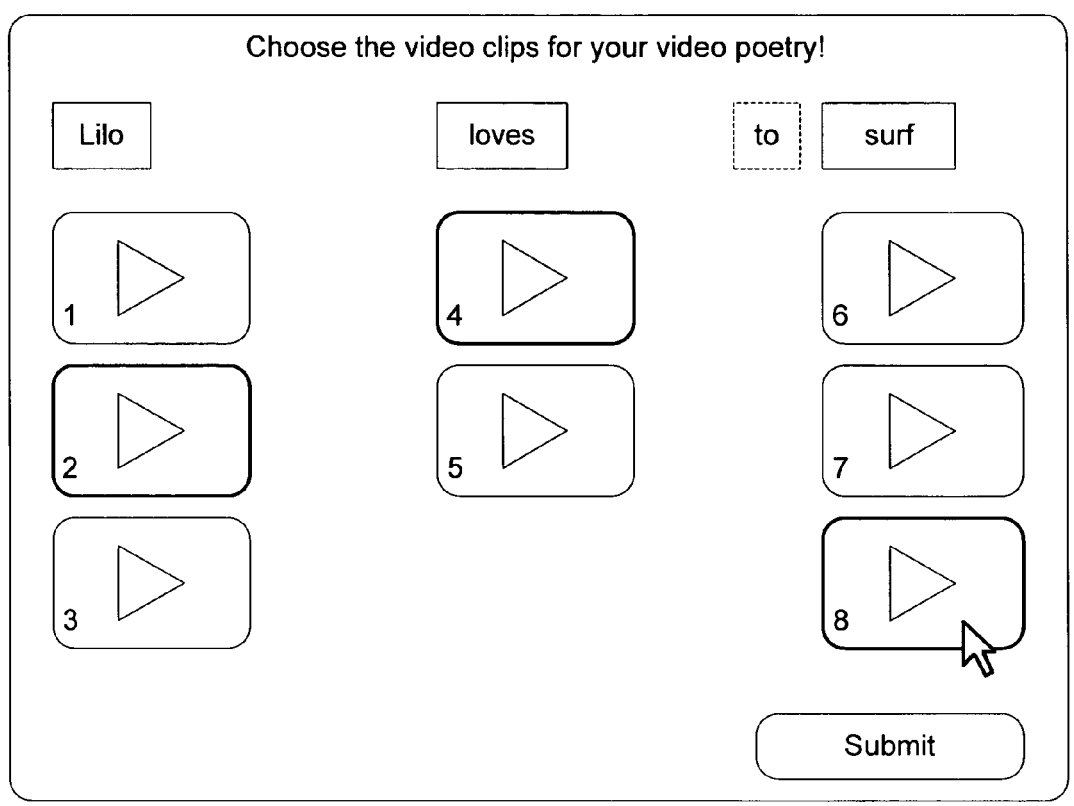
FIG. 2 presents a user interface for selecting text based related media for video poetry, according to one embodiment of the present invention.

FIG. 2 presents a user interface for selecting text based related media for video poetry, according to one embodiment of the present invention. As shown in display 200 of FIG. 2, the user is invited to select from a variety of text based related media to match to each text phrase selected in FIG. 1. Thus, the user is invited to select from media 1, 2, or 3 for the text phrase "Lilo", from media 4 or 5 for the text phrase "loves", and from media 6, 7, or 8 for the text phrase "surf". For example, media 1 through 3 may show various video clips of the character Lilo, media 4 through 5 may show various video clips related to the concept of "love", such as hearts or kissing, and media 6 through 8 may show various video clips of surfing or surfboards.

While display 200 of FIG. 2 shows text based related media as individually associated with each particular text phrase selected from FIG. 1, alternative embodiments may have text based related media associated with multiple text phrases selected from FIG. 1. For example, the text phrases "Lilo" and "loves" might be combined into a single phrase, and various video clips might be shown representing the concept "Lilo loves". For example, one video clip could show the character Lilo with hearts radiating out, whereas another video clip could show the character Lilo kissing her beloved sister. These associations might be programmed into the system directly by moderators and administrators, or may be provided by the public using video keyword tagging or other methods of information organization. For example, a video sharing site may allow users to comment or provide tags for particular segments of longer clips, and these segments may be linked into the user interface shown in FIG. 2. Given a large user population and diverse source video material, the associations provided by the public may provide, over time, insight into popular trends that can be used to further optimize and enhance the selection experience. Additionally, opportunities for personalization may be provided here as well. For example, user provided content, for example captured through a connected web camera, could also be supported.

As shown in display 200 of FIG. 2, the preposition "to" has automatically been inserted before "surf" to provide a grammatically correct sentence. Similar automatic adjustments may be made to accommodate articles, pronouns, plural forms, and other grammar or language elements. Thus, the user may focus only on the most important word elements, such as nouns and verbs. However, in alternative embodiments, the user may also manually adjust such elements. As shown in display 200, such minor sentence elements may omit associated text based related media, as it may be distracting or difficult to associate every minor portion of a sentence to a related media.

Additionally, the grammatical structure including the cadence or flow of the generated sentence may be analyzed to change the video clips shown for selection and to affect the way the final video poetry or video mash-up is created. For example, a sentence featuring primarily staccato words and phrases may present short video clips and use quick, high impact transition effects for final video creation. On the other hand, a sentence using longer words and phrases in a drawn out manner may instead present longer video clips and use subtle and smooth transition effects for final video creation. Sentence cadence may also affect playback speed in a similar manner, for example by increasing or decreasing the frames per second (FPS) rate during playback. For example, dynamic action verbs such as "jump" might have associated video clips played back at a higher FPS rate, while relaxed adverbs such as "leisurely" might have associated video clips played back at a lower FPS rate. Of course, in the final video file, all video clips may be converted and normalized to a single constant FPS rate for simplicity and compatibility. Points of emphasis, such as the beginning or ending of syllables, may also be used for the timing of effects and visual cues or synchronization with music. Furthermore, as previously discussed, since speech recognition may be used to form the sentence, audio cues such as tone, word emphasis and pacing may also be utilized to perform similar adjustments as described above in conjunction with sentence structure.

While the video clips shown in display 200 of FIG. 2 are labeled from number 1 through 8 for convenience, alternative embodiments may include more descriptive captions, tags, and other information to help the user decide which video clips to select. Furthermore, while only a maximum of three related video clips are shown for each text phrase, alternative embodiments may include any number of related video clips for each text phrase. While FIG. 2 shows the selection of video clips by clicking on a desired video clip from a list, this method may be impractical if a large number of related media is available for selection. Alternative embodiments may therefore allow the use text auto-completion as previously discussed in conjunction with FIG. 1, or other selection interfaces, such as a random selection or reshuffle button. Additionally, although videos are shown in FIG. 2, alternative embodiments may use still frames or audio only rather than animated video. Moreover, the user may be provided additional options, such as the selection of background music, which are not shown in FIG. 2. Once the user is satisfied with the video selections, the user may click the "Submit" button to proceed to the next step, shown in FIG. 3.

Figure 3:
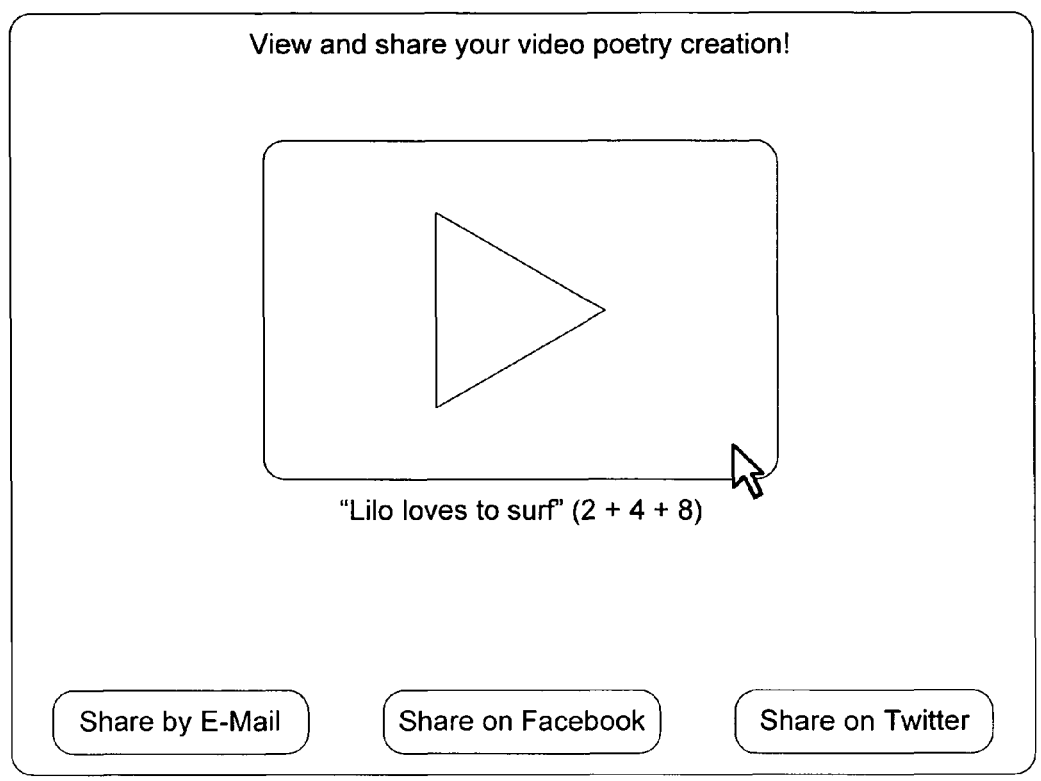
FIG. 3 presents a user interface for viewing and sharing video poetry using text based related media, according to one embodiment of the present invention.

FIG. 3 presents a user interface for viewing and sharing video poetry using text based related media, according to one embodiment of the present invention. As shown in display 300 of FIG. 3, the user is now given the opportunity to view and share the video poetry creation that has been automatically generated for the user using the video clips selected from FIG. 2. A processor of the server presenting the interface of display 300 in FIG. 3 may, for example, determine appropriate fading, mixing, transitions, effects, music, and other elements necessary to smoothly integrate the video clips selected from FIG. 2 into a unified "video poetry" clip. Thus, the user is spared from having to manually integrate the video clips together, a technical and tedious process comprising a high barrier of entry for potential video poetry composers. As shown in display 300 of FIG. 3, the resulting video poetry is automatically given a descriptive caption detailing the original sentence and the video clips used to create the video poetry. However, the user might manually adjust the caption for greater creative impact or for brevity.

If the user is satisfied with the end result, the user may share the creation with friends and associates online by using E-mail or social networking services such as FACEBOOK® and TWITTER®, as shown in display 300 of FIG. 3. Thus, the video poetry may enjoy viral distribution, providing positive publicity for both the user and the original content providers associated with the video content. Additionally, some users may become inspired to create their own video poetry using the easy to use system described herein, further enhancing the viral effect. Furthermore, by optionally inserting promotional elements such as pre-roll advertisements or web links to related products or services, companies can also receive direct monetary benefits as well.

Figure 4:
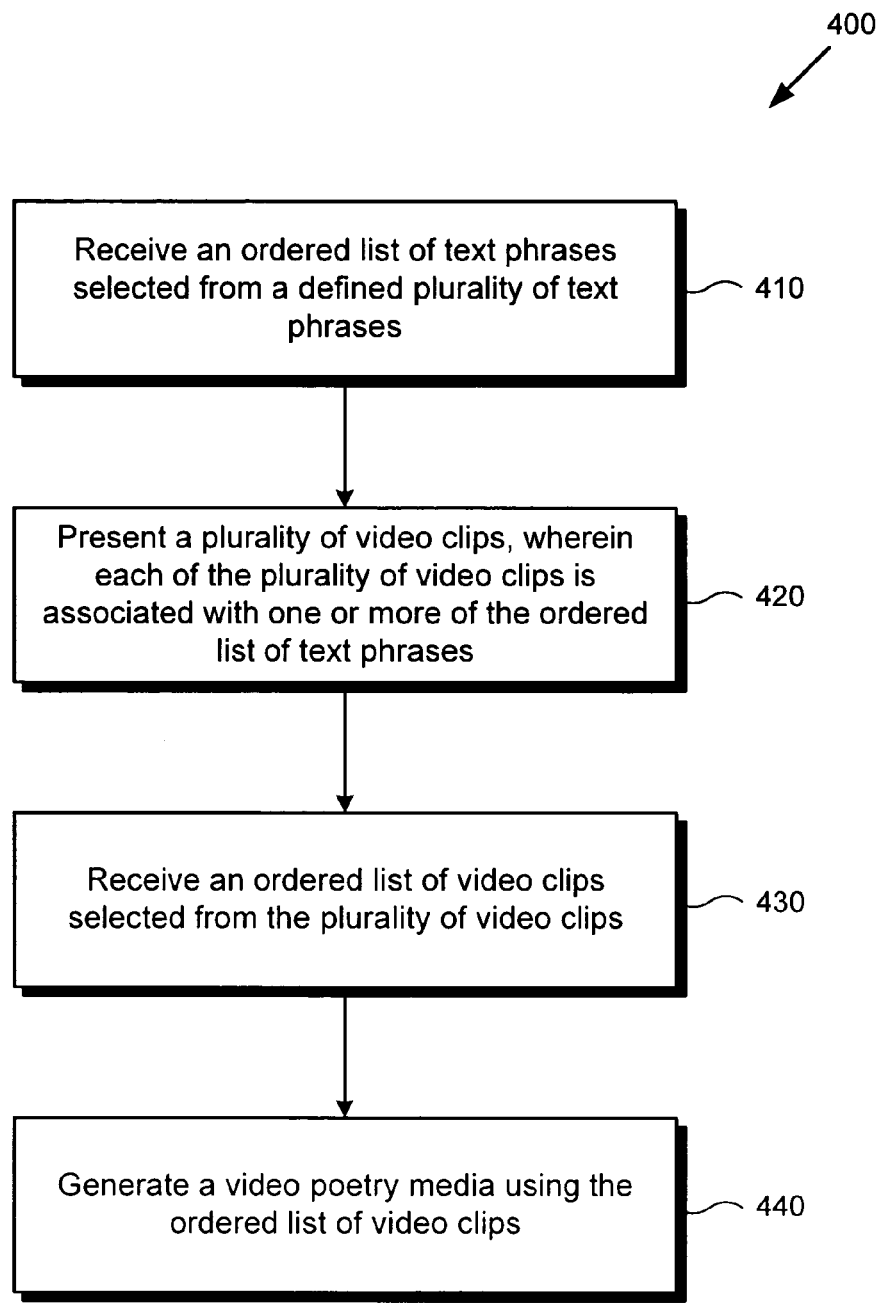
FIG. 4 shows a flowchart describing the steps, according to one embodiment of the present invention, by which video poetry media can be created using text based related media.

FIG. 4 shows a flowchart describing the steps, according to one embodiment of the present invention, by which video poetry media can be created using text based related media. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and display 100 of FIG. 1, step 410 of flowchart 400 comprises receiving an ordered list of text phrases selected from a defined plurality of text phrases shown in display 100. As previously discussed, the defined plurality of text phrases shown in display 100 are selected to be related to the creative property LILO AND STITCH® by DISNEY®, but alternative criteria may be used as well. Additionally, as previously discussed, while a drag and drop interface for selecting the ordered list is shown in display 100, alternative input methods such as typing with auto completion may be used as well. In the embodiment shown in display 100, the ordered list comprises the three text phrases "Lilo", "loves", and "surf" in order.

Referring to step 420 of flowchart 400 in FIG. 4 and display 200 of FIG. 2, step 420 of flowchart 400 comprises presenting a plurality of video clips, wherein each of the plurality of video clips is associated with one or more of the ordered list of text phrases selected from step 410. In the particular embodiment shown in display 200, video clips labeled 1 through 3 are associated with the text phrase "Lilo", video clips labeled 4 through 5 are associated with the text phrase "loves", and video clips labeled 6 through 8 are associated with the text phrase "surf". However, as previously discussed, video clips may be chosen to associate with multiple text phrases, such as "Lilo" and "loves".

Referring to step 430 of flowchart 400 in FIG. 4 and display 200 of FIG. 2, step 430 of flowchart 400 comprises receiving an ordered list of video clips selected from the plurality of video clips presented in step 420. As shown in display 200 of FIG. 2, the user may provide the ordered list by clicking on the desired video clips, which are then highlighted with a thicker border, and then clicking the "Submit" button. However, as previously discussed, this simple selection method may be insufficient if a large number of video clips are being presented, and thus alternative input methods such as entry by text with automatic completion may be supported as well.

Referring to step 440 of flowchart 400 in FIG. 4 and display 300 of FIG. 3, step 440 of flowchart 400 comprises generating a video poetry media using the ordered list of video clips received in step 430. As described above, a processor of the web server providing the user interfaces shown in FIGS. 1 through 3 may generate the video poetry media. However, alternative embodiments may utilize processors of different servers, such as dedicated video encoding machines, for load balancing or other reasons. Thus, a processor may employ video processing, transitions, mixing effects, and other techniques to generate a unified video poetry video shown in display 300 of FIG. 3. As previously described, the resulting video poetry video may then be shared online using E-mail or social networking services to encourage the "viral" effect and promote positive publicity for both the video poem creator and the original content owners.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for creating a unified video clip, the method comprising:
  presenting a user interface that displays a plurality of pre-defined words to a user for the user to select from for forming a sentence;
  receiving an ordered list of pre-defined words selected by the user from the plurality of pre-defined words to form the sentence;
  presenting a plurality of video clips to the user, wherein each of the plurality of video clips includes a content having a concept representing at least one pre-defined word from the ordered list of pre-defined words;
  receiving an ordered list of video clips selected by the user from the plurality of video clips; and
  generating the unified video clip using the ordered list of video clips, wherein the generating includes automatically creating a label for the unified video clip using the ordered list of pre-defined words selected by the user for the unified video clip.

2. The method of claim 1, wherein the plurality of pre-defined words is associated with a selected category.

3. The method of claim 1, wherein the plurality of pre-defined words is extracted from associated tags of a linked media.

4. The method of claim 1, wherein the plurality of pre-defined words is associated with a creative property.

5. The method of claim 1, wherein the receiving of the ordered list of pre-defined words is by the user interface supporting at least one of dragging-and-dropping and typing with auto completion.

6. The method of claim 1, wherein the descriptive caption is manually adjustable.

7. The method of claim 1, wherein the presenting of the plurality of video clips is grouped based on the respective at least one pre-defined words with which each of the plurality of video clips is associated.

8. The method of claim 1, wherein the generating of the unified video clip is affected by a grammatical structure of the ordered list of pre-defined words.

9. The method of claim 1, wherein the generating of the unified video clip media applies at least one of fading, mixing, transitions, effects, and music to smoothly integrate the ordered list of video clips.

10. The method of claim 1, wherein a respective length of each of the plurality of video clips corresponds to each of the pre-defined words selected by the user.

11. A system for creating a unified video clip media, the system comprising:
  a display; and
  a hardware processor that:
    presents, on the display, a user interface that provides a plurality of pre-defined words to a user for the user to select from for forming a sentence;
    receives an ordered list of pre-defined words selected by the user from the plurality of pre-defined words to form the sentence;
    presents, on the display, a plurality of video clips to the user, wherein each of the plurality of video clips includes a content having a concept representing at least one pre-defined word from the ordered list of pre-defined words;
    receives an ordered list of video clips selected by the user from the plurality of video clips; and
    generates the unified video clip using the ordered list of video clips, wherein the generating includes automatically creating a label for the unified video clip using the ordered list of pre-defined words selected by the user for the unified video clip.

12. The system of claim 11, wherein the plurality of pre-defined words is associated with a selected category.

13. The system of claim 11, wherein the plurality of pre-defined words is extracted from associated tags of a linked media.

14. The system of claim 11, wherein the plurality of pre-defined words is associated with a creative property.

15. The system of claim 11, wherein the user interface supports at least one of dragging-and-dropping and typing with auto completion.

16. The system of claim 11, wherein the descriptive caption is manually adjustable.

17. The system of claim 11, wherein the user interface presents the plurality of video clips grouped based on the respective at least one pre-defined word with which each of the plurality of video clips is associated.

18. The system of claim 11, wherein the user interface generates the unified video clip affected by a grammatical structure of the ordered list of pre-defined words.

19. The system of claim 11, wherein the user interface generates the unified video clip using at least one of fading, mixing, transitions, effects, and music to smoothly integrate the ordered list of video clips.

20. The system of claim 11, wherein a respective length of each of the plurality of video clips corresponds to each of the pre-defined words selected by the user.

* * * * *